United States Patent [19]
Wagner et al.

[11] 3,856,756

[45] Dec. 24, 1974

[54] SILYL SUBSTITUTED UREA DERIVATIVES AND A PROCESS FOR THEIR PREPARATION

[75] Inventors: Kuno Wagner, Leverkusen; Günter Oertel, Cologne, both of Germany; Hans Dietrich Gölitz, deceased, late of Cologne, Germany by Ingrid Irene Klärch Gölitz, heiress; Bernd Quiring, Leverkusen, Germany

[73] Assignee: Bayer Aktiengesellschaft, Leverkusen, Germany

[22] Filed: Nov. 3, 1972

[21] Appl. No.: 303,671

[30] Foreign Application Priority Data
Nov. 6, 1971   Germany............................ 2155259

[52] U.S. Cl.....260/77.5 AQ, 117/132 R, 117/138.8 R, 117/139.5 A, 117/142, 117/148, 260/33.4 UR, 260/33.6 UB, 260/46.5 E, 260/46.5 G, 260/75 NH, 260/75 TN, 260/75 NQ 260/77.5 AP, 260/77.5 AM, 260/77.5 AN, 260/77.5 AS, 260/77.5 CH, 260/448.2 N

[51] Int. Cl............................................. C08g 22/08

[58] Field of Search............ 260/46.5 E, 46.5 G, 77, 260/.5 AQ, 77.5 AP, 77.5 AM, 77.5 AN, 77.5 AS, 77.5 CH, 75 NH, 75 TN, 75 NQ, 448.2 N

[56] References Cited
UNITED STATES PATENTS

| | | | |
|---|---|---|---|
| 3,576,033 | 4/1971 | Tesoro et al. | 260/46.5 E |
| 3,627,722 | 12/1971 | Seiter | 260/77.5 AM |
| 3,632,557 | 1/1972 | Brode et al. | 260/77.5 AP |
| 3,657,303 | 4/1972 | Golitz et al. | 260/448.2 N |
| 3,676,478 | 7/1972 | Golitz et al. | 260/46.5 E |
| 3,711,442 | 1/1973 | LeFort et al. | 260/77.5 AM |
| 3,711,445 | 1/1973 | Chu et al. | 260/77.5 AM |
| 3,726,907 | 4/1973 | Tesoro et al. | 260/77.5 CH |

FOREIGN PATENTS OR APPLICATIONS

1,207,594   10/1970   Great Britain................. 260/46.5 G

*Primary Examiner*—Melvyn I. Marquis
*Attorney, Agent, or Firm*—Gene Harsh

[57]   ABSTRACT

A process for the preparation of polyaddition compounds of controlled reactivity by reacting polyaddition products which contain alkoxysilane groups of the general formula

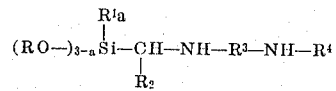

in which

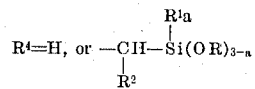

are reacted with organic polyisocyanates.

5 Claims, No Drawings

SILYL SUBSTITUTED UREA DERIVATIVES AND A PROCESS FOR THEIR PREPARATION

Silyl substituted urea derivatives have been disclosed in German Offenlegungsschrift No. 1,812,562. They are prepared by reacting aminoalkylsilane derivatives with polyethers which contain isocyanate groups. The substances obtained from this reaction are suitable for use as adhesives, surface agents and as starting materials for the preparation of organopolysiloxanes. An important feature of these silyl substituted urea derivatives is that they are synthesized from polyethers which contain only one urethane group for each hydroxyl group. Thus they have an extremely low concentration of urethane groups and the only urea groups which they contain substituted urea end groups. These products are not suitable for the production of high quality films which can be cross-linked in the cold, light fast lacquers, fibers or coatings and sheet structures which are very tough and have great strength and hardness, abrasion resistance and tear resistance and high elasticity. Although they are very reactive towards moisture, they are not stable in storage and owing to their poor mechanical properties they are unsuitable for practical use. British Pat. No. 1,207,594 teaches the preparation of a vulcanizable polymer by reacting isocyanate terminated polyurethanes and/or polyureas with an organosilocone compound having a reactive hydrogen atom. The compounds disclosed in this British patent are, however, no aminomethyl alkoxysilane derivatives and exhibit for this reason a reactivity which is far below the reactivity of the compounds of the present invention. The reactivity of the new aminomethyl alkoxysilane derivatives is in fact at least 1,000 times higher than the reactivity of the compounds of the British patent. A further difference between the process of British Pat. No. 1,207,594 and the process of this invention resides in the fact that according to the British patent alkoxysilane endgroups are incorporated into the polymers whereas according to this invention chain-lengthening agents are used during the preparation of the polyaddition products which contain alkoxsilane groups thus providing polymers which do not only contain alkoxysilane endgroups but which contain these groups distributed all over the molecule. Such polymer compounds containing aminomethylalkoxysilane derivatives which combine high stability in storage with high reactivity in use and high quality of the end products have not previously become known.

These technically advantageous products are made available by this invention.

It has surprisingly been found that the high reactivity of polyaddition compounds which contain α-aminomethyl-alkoxysilane derivatives, even of those polyaddition compounds which have a very high molecular weight, can be controlled in various ways which can be put to technical use. Thus while the products maintain their good storage stability, their reactivity may be either increased or moderated according to the field of application for which they are intended and properties of the cross-linked end products can be improved very significantly compared with those obtained by the methods of the prior art. Synthesis of the polyaddition products can be carried out smoothly in spite of the extremely high reactivity of the products towards moisture. According to a particularly preferred embodiment of the process, this is achieved by the synthesis of those polyaddition products which have a marked tendency to association due to their hydrogen bridge bonds on their molecular association and by using previously unknown specifically stabilizing substances for the synthesis.

The invention relates to a process for the preparation of polyaddition products which contain alkoxysilane groups, characterized in that compounds of the general formula:

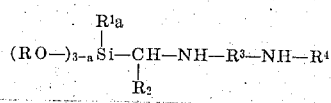

in which
R represents a $C_1$–$C_{18}$ alkyl radical or a $C_4$–$C_{14}$ cycloalkyl radical or a phenyl radical,
$R^1$ represents an optionally halosubstituted or cyano-substituted $C_1$–$C_{10}$ alkyl, $C_4$–$C_{10}$ cycloalkyl or $C_6$–$C_{10}$ aryl radical
$R^2$ represents a hydrogen atom or a methyl or phenyl radical,
$R^3$ represents a divalent aliphatic, cycloaliphatic, araliphatic or aromatic hydrocarbon radical with 2 to 16 carbon atoms, and

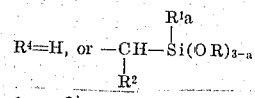

in which $a = 0$, 1 or 2
are reacted with organic polyisocyanates and, if desired, with compounds which contain at least two active hydrogen atoms and have a molecular weight of 62 to 6,000, if desired in the presence of solvents.

The starting materials used for the preparation of the products according to the invention may be known organic polyisocyanates such as, for example, aliphatic, cycloaliphatic, araliphatic or aromatic polyisocyanates, for example tetramethylene-1,4-diisocyanate, hexamethylene-1,6-diisocyanate, dodecane-1,12-diisocyanate, cyclohexane-1,3-and -1,4-diisocyanate or any mixtures of these isomers, 1-isocyanato-3,3,5-trimethyl-5-isocyanatomethyl-cyclohexane, phenylene-1,3-and-1,4-diisocyanate, tolyene-2,4-and-2,6-diisocyanate and any mixtures of these isomers, m-xylylene-diisocyanate, hexahydrotolylene-2,4- and -2,6-diisocyanate and any mixtures of these isomers, n,n'-diisocyanatodicyclohexylmethane, diphenylmethane-4,4'-diisocyanate, naphtylene-1,5-diisocyanate, triphenylmethane-4,4',4''-triisocyanate, polyphenylpolymethylenepolyisocyanates which may be obtained by aniline-formaldehyde condensation followed by phosgenation, polyisocyanates containing carbodiimide isocyanate addition products as obtained according to German Pat. No. 1,092,007, the diisocyanates described in U.S. Pat. No. 3,492,330, polyisocyanates containing allophanate groups as described in British Pat. No. 994,890, Belgian Pat. No. 761,626, and published Dutch Pat. No. 7,102,524, isocyanurate polyisocyanates as described in German Pat. Nos. 1,022,789 and 1,027,394 and in German Offenlegungsschrift Nos. 1,929,034 and 2,004,048, biuret polyisocyanates as described in German Pat. No. 1,101,394, in British Pat. No. 889,050 and in French Pat. No. 7,017,514, polyisocyanates prepared by telomerization reactions as described in Belgian Pat. No. 723,640, polyisocyanates containing ester groups as described in British Pat. Nos. 956,474 and 1,072,956 and the aliphatic, cycloaliphatic, araliphatic or aromatic polyisocyanates mentioned by W. Siefgen in Justus Liebig's Annalen der Chemie, 562, pages 75 to 136, reaction products of the above mentioned isocyanates with acetals according to German Pat. No. 1,072,385 and isocyanates of the type mentioned in German Pat. Nos. 1,022,789 and 1,027,394.

Any mixtures of the above mentioned polyisocyanates may, of course, also be used.

It is generally preferred to use the commercially readily accessible polyisocyanates, e.g., tolylene-2,4-and-2,6-diisocyanate and any mixtures of these isomers and polyphenyl-polymethylene polyisocyanates which may be prepared by aniline-formaldehyde condensation followed by phosgenation.

Tetramethylene-1,4-diisocyanate, hexamethylene-1,6-diisocyanate, 1-isocyanato-3,3,5-trimethyl-5-isocyanatomethyl-cyclohexane, m-xylylene-diisocyanate and 4,4'-diisocyanato dicylclohexylmethane are also preferred.

The compounds containing at least two hydrogen atoms which are reactive with isocyanates which may, if desired, be used in the proces should be understood to mean mainly polyhydroxyl compounds or polyamines. These compounds have molecular weights of 62 to 10,000, preferably 800 to 5,000. They are known per se and have been described, for example, in Kunststoff-Handbuch, Volume VII, Polyurethane, by Vieweg and Hochtlen, publishers Carl Hanser Verlag, Munich, 1966, pages 45–74. The following are examples: ethylene glycol, butylene glycol, hexane-1,6-diol, ethylenediamine, trimethylolpropane, sorbitol, pentaerythritol and sucrose.

There may also be mentioned by way of example the linear or branched polyesters or polyester amides which may be prepared from monofunctional or polyfunctional alcohols and carboxylic acids or hydroxycarboxylic acids, if desired with the addition of amino alcohols, diamines, hydroxylamines or aminocarboxylic acids by known methods; these polyesters and polyester amides may also contain hetero atoms, double or triple bonds or modifying radicals of unsaturated or saturated fatty acids or fatty acid alcohols. Linear polyalkylene glycol ethers obtained by the polymerization of alkylene oxides, diethylene oxide, propylene oxide, styrene ⁻ide, epichlorophydrin should also be mentioned. Copolymers may also be used. Linear or branched addition products obtained by the addition of the above mentioned alkylene oxides to, for example, polyfunctional alcohols, amino alcohols or amines should also be mentioned. The following are given as examples of polyfunctional starting compounds which may be used for the addition of the alkylene oxides: $H_2O$, ethylene glycol, 1,2-propylene glycol, rimethylolpropane, butane-1,2,4-triol, glycerol, pentaerythritol, sorbitol, oligosaccharides and their aqueous solutions, polysaccharides, castor oil, ethanolamine, diethanolamine, triethanolamine, aniline, arylene diamines, alkylene diamines of the type of ethylne diamine, tetra or hexa-methylene diamine or also ammonia. Mixtures of various types of linear and/or branched polyalkylene glycol ethers may, of course, be used. These polyalkylene glycol ethers may also be used as mixtures with other hydroxyl compounds or amines, e.g., as mixtures with 1,4-butylene glycol, trimethylolpropane, glycerol, 2,3-butylene glycol, pentaerythritol, tartaric acid esters, castor oil, tall oil, polyesters, OH-containing polycarbonates, polyacetals, polyamides, polylactones and polylactams. Polythioethers which contain OH and/or SH groups, phenols which have been reacted with alkylene oxide, formaldehyde resins, hydrogenation products of ethylene-olefin-carbon monoxide copolymers and epoxy resins, compounds which contain amino groups such as amino-polyethers, polyesters or polyurethanes and compounds which contain carboxyl groups and/or cyclic anhydride groups and which may in addition contain ether, ester, amide, urea, urethane or thioether groups are also examples of suitable compounds which contain active hydrogen atoms.

The compounds which are preferred for the invention are polyesters which contain at least two hydroxyl groups and have a molecular weight of 400 to 4,00, e.g., polyesters prepared by reacting an organic dicarboxylic acid with a dihydric alcohol, such as, adipic acid or phthalic acid with, for example, ethylene glycol, butylene glycol, hexane-1,6-diol or neopentyl glycol; polyethers with a molecular weight of 400 to 4,000 which may be prepared e.g., by the polymerization of tetrahydrofuran; thioethers with a molecular weight of 400 to 4,000 which may be prepared e.g., by self-condensation of thiodiglycol; polycarbonates containing at least two hydroxyl groups and having a molecular weight of 400 to 4,000, which may be prepared e.g., by reacting hexane-1,6-diol with diphenylcarbonate.

The following are examples of silane derivatives of the formula

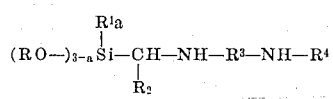

in which $R, R^1, R^2, R^3, R^4$ and $a$ have the meanings already given above which may be used for preparing the products of the process:

1. $H_2N—CH_2—CH_2—NH—CH_2—Si(—OC_2H_5)_3$

2. 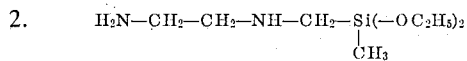

3. 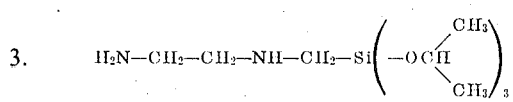

4. $H_2N—CH_2—CH_2—NH—CH_2—Si(—OC_4H_9)_3$
5. $H_2N—CH_2—CH_2—NH—CH_2—Si(—OCH_2—C_6H_5)_3$
6. $H_2N—(CH_2)_6—NH—CH_2—Si(—OC_2H_5)_3$

7. 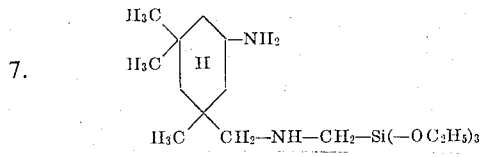

8. $(C_2H_5O—)_3Si—CH_2—HN—(CH_2)_6—NH—CH_2—Si(—OC_2H_5)_3$

9. 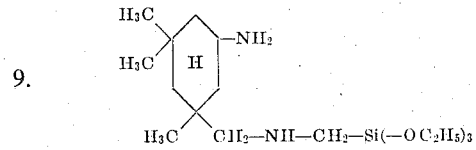

10. 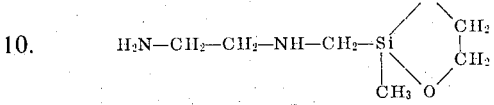

The silane derivatives may be prepared according to the method disclosed in German Offenlegungsscherift Nos. 1,812,564 and 1,812,562. They may generally be prepared by, for example, reacting amines of the formula $R^4—HN—R^3—NH_2$ with, for example, chloromethyl triethoxysilane, bromomethyl-triethoxysilane, methyl-chloromethyl-diethoxysilane, dimethyl-chloromethyl-ethoxysilane, methyl-bromomethyldiethoxysilane or methyl-bromomethyl-di-n-propoxysilane.

The products of the process are prepared by reacting a silane derivative of the formula

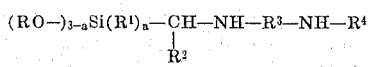

in which R, $R^1$, $R^2$, $R^3$, $R^4$ and $a$ have the meanings already given with a polyisocyanate and, if desired, with compounds which contain at least two active hydrogen atoms at a temperature of between −20°C. and +150°C., preferably in the presence of a solvent. The proportions of polyisocyanate, silane derivative of the above mentioned formula and, if these are used, the compounds containing active hydrogen atoms are so calculated that the reactants are generally used in equivalent quantities, i.e., the reaction mixture contains one isocyanate group to one amino group. The polyisocyanates may, if desired, be used in a masked form, i.e., as a reaction product with a compound which is easily split off, e.g., as reaction product with phenols, tertiary butanol or imidazole or as uretidone derivative or bisulphite addition product. The use of isocyanates in a masked form is already known. The compounds preferably used are α, ω-diisocyanato polyesters, α, ω-diisocyanatopolyethers, α, ω-diisocyanato polyester urethanes and/or polyureas and additional chain lengthening agents preferably diamines, e.g., ethylene diamine, trimethylene diamine, hexamethylene-1,6-diamine, 1-amino-3,3,5-trimethyl-5-aminomethyl-cyclohexane, 4,4′-diamino-dicyclohexylmethane, hydrazine, hydrazine hydrate, carodihydrazide or 4,4′-diamino-diphenylmethane.

The reaction of the above mentioned components is preferably carried out in the presence of a solvent, e.g., benzene, toluene, cyclohexane, acetone, ethyl acetate, tetraline, dimethylformamide, ethanol, n-propanol or n-butanol.

The surprising observation was made that the products of the process were obtained in a form which is stable in storage if secondary or tertiary alcohols or halogenated alcohols, araliphatic alcohols or halo-genated hydrocarbons or acylated amides are present during the reaction of the above mentioned silane derivatives of the given general formula with the polyisocyanates. According to a preferred method of carrying out the process of the invention, therefore, the solvent consists completely or partly of secondary or tertiary alcohols or halogenated hydrocarbons or acylated amides. The secondary or tertiary alcohols or halogenated hydrocarbons or acylated amides may be present in amounts of 0.5 to 97% by weight, preferably 10 to 80% by weight, based on the sum of the reactants. Premature gelling, cross-linking or sedimentation of the reaction products dissolved in the solvent can thereby be prevented.

The secondary or tertiary alcohols may be isopropanol, isobutanol, cyclohexanol, tertiary amyl alcohol or tertiary butanol; suitable chlorinated alcohols are chloroethanol and trichloroethanol and the araliphatic alcohol may be benzyl alcohol. Isopropyl alcohol and tertiary butanol are preferred. Preferred solvent mixtures are toluene isopropanol (1:1), toluene tertiary butanol (1:1), xylene-isopropanol ethanol (1:1:1) and toluene-tertiary butanol-n-butanol (1:1:1) (proportions by weight).

Suitable halogenated hydrocarbons are e.g. ethylene chloride, chloroform, trichloromonofluoromethane, perchloroethylene and trichloroethylene. Suitable acylated amides are particularly dimethylformamide, methylformamide and dimethylacetamide.

The stabilizing effect of the secondary or tertiary alcohols may be further increased and at the same time, the reactivity of the products of the process to atmospheric moisture during cross-linking may be very greatly increased, by adding small quantities of acid anhydride and acids or compounds which split off acids. The activating effect of these acid additives comes into play during the evaporation process; in sealed solutions these additives keep the viscosity of the solutions completely constant and this constancy is maintained over a period of six months within the limits of error of measuring the viscosity. This combination of stabilizing and activating effect during the cross-linking reactions is of great practical importance because it not only ensures long term stability in vessels which have been sealed from atmospheric moisture but also enables very rapid cross-linking to be achieved at the required time even at temperatures of about −10°C. The new substances according to the invention, which are highly reactive and very easily cross-linked via the siloxane groups, can thus be converted into products which are stable in storage so that a very wide field of application is opened up to these new polymers which can then be cross-linked whenever required. Because of their speed of cross-linking and the quantitative result of cross-linking with the formation of stable polysiloxane bonds the polymers synthesized by this process have a uniquely excellent position in the chemistry of cross-linkable high molecular weight polymers.

The process according to the invention can be used for the production of a wide variety of polymers which can be cross-linked in the cold by atmospheric moisture, organic solvents containing moisture or inert gases containing moisture, and which may even be cross-linked at temperatures below 0°C., without catalysts, without the addition of cross-linking agents and without supply of heat.

The following are given as examples of acids, acid anhydrides or compounds which split off acids, which in the context of this invention produce an additional stablizing effect but act as activators in the cross-linking of the products according to the invention by atmospheric moisture: acetic anhydride, acetic acid, formic acid, propionic acid, butyric acid, trichloroacetic acid, p-toluenesulphonic acid esters, dimethylcarbamic acid chloride, benzoyl chloride, N-phenylcarbamic acid chloride, chloroacetaldehyde, chloral, propionic anhydride, mixed anhydrides of lower carboxylic acids, cyclic anhydrides such as maleic anhydride, phthalic anhydride, tetrahydrophthalic anhydride, semiesters of cyclic acid anhydrides obtained e.g., from 1 mol of phthalic anhydride and 1 mol of methanol, butanol or isopropanol or semiesters of these cyclic acid anhydrides with glycols which in addition contain an OH and carboxyl group in the molecule, e.g., semiesters obtained from 1 mol of maleic anhydride or hexahydrophthalic anhydride and 1 mole of glycol, 1,3-propylene glycol or 1,4-butanediol. The addition of small quantities of readily hydrolyzed esters such as boric acid esters diethyloxalate, ethyl orthoformate, reaction products of p-toluene-sulphonylisocyanate with alcohols or amines or small quantities of p-toluenesulphonyl isocyanate, acyl isocyanate such as benzoyl isocyanate or hydrochlorides of trimethylamine or triethylamine may also be advantageous. These substances which act as stabilizers and at the same time accelerate the cross-linking process are preferably added in quantities of 0.2 to 5% by weight, based on the solid substance, to solutions of the products of the process in alcohol mixtures or in stabilizing solvents such as chloroform, methylene chloride, perchloroethylene, trichloroethylene, dimethylformamide, dimethylacetamide or formamide.

If the products of the process are synthesized without stabilizing alcohols or stabilizing solvents mentioned above being present, it may often be advantageous to add water binding agents such as methoxymethylisocyanate, phenylisocyanate, p-tolylsulphonylisocyanate, acylisocyanates or chlorocarbonylisocyanate or readily saponifiable esters of oxalic acid or boric acid to the solutions of the products in inert organic solvents such as acetone, methyl ethyl ketone, methyl isopropyl ketone, ethyl acetate, butyl acetate, xylene, toluene, dioxane, 1,3-dioxane, cyclohexanone or mixtures of these solvents and thereafter in addition add the stabilizing alcohols. If desired, aliphatic, cycloaliphatic or araliphatic carboxylic acid anhydrides, mixed anhydrides or cyclic anhydrides may also be added in larger quantities, e.g., 10 to 15% by weight. In that case, a small amount of acyloxy-silane groups or, if free carboxylic acids are added, a small amount of silanol groups may be formed in the dissolved products of the process by exchange reactions with alkoxy groups.

Known active or inactive fillers may be added to the products of the process, e.g., chalk, talcum, silica, silica gel, quartz powder, titanium dioxide, iron oxides, zirconium silicate, calcium sulphate, aluminium oxide, magnesium oxide, carbon black, graphite sand and known finely dispersed fillers based on silicon oxide; all these fillers may either be used in highly dehydrated form or they may be rendered anhydrous by dehydration in the preferred stabilizing alcohols and their acid additives.

The products of the process, and especially those which have been stabilized in accordance with the invention, are high quality substances which can very easily be cross-linked in the cold, i.e., without the action of heat, by means of moisture or masked compounds which split off water, and they can be converted into a large variety of end products, e.g., elastic or hard cross-linked polymers which have a high resistance to chemicals and temperature resistance. They may be used for the production of highly elastic films, for the production of very light-fast and chemically resistant lacquer coatings and films on any supports, for the production of rubbery elastic products, fibers or sealing compositions of any kind; they may also be used for embedding electrical elements, for insulating against cold or heat, for laminating various pigments, for use as elastic coverings for various water-soluble plant nutrient salts, medicaments, as anticorrosives, as gums for metals such as silver, aluminium or copper, as highly adhesive, non-cross-linking agents for rendering substances hydrophobic, as rapidly cross-linking surface active compounds, as laminating and rubberizing agents for fibers and fleeces, as bonding agents for fleeces and as excellent adhesives. According to the invention, a very wide variety of synthetic resin segments can be cross-linked via the siloxane bridges and combined with each other, and in many cases the bonding power, degree of cross-linking and swelling of the products according to the invention can be controlled by adding, either at the stage of production or during cross-linking, 2 to 60% by weight of aminoalkylsilane derivatives of the following general formula which has already been mentioned above:

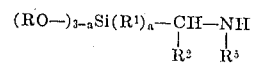

in which R R¹, R² and $a$ have the meaning already indicated and R⁵ represents a hydrogen atom or an optionally cyano substituted alkyl, cycloalkyl, arylalkyl, aryl or alkylaryl radical with up to 46 carbon atoms. The use of products which are stabilized and then activated when put into use in accordance with the invention opens up the possibility of new industrial techniques for the coating, impregnation and tack-free sheathing of any synthetic or natural fibers or threads which can be coated tack-free and rolled up at high speed without sticking. It also opens up the possibility of rapid dip varnishing, dip coating for insulating cables, the production of rapidly reacting cable sheathings for wire lacquering, and the application of rapidly cross-linking substances with adhesive properties and high bond strengths. The use of these products is also of interest for the rapid and tack-free covering of pigments which contain moisture.

The products according to the invention may, if desired, be mixed with organopolysiloxanes which can be cross-linked in known manner, e.g., those which are prepared by the condensation of chlorsilanes and alkoxysilanes by cohydrolysis with water or by the polymerization of cyclic organo-siloxanes with the aid of alkaline or acid catalysts, and they may be cross-linked e.g., together with α, ⅔-dihydroxy-polydimethylsiloxanes. The products of the process are also very interesting reactive substances for carrying out matrix reactions in accordance with Belgian Pat. No. 746,982 and for impregnating foam resins.

The new substances according to the invention also enable the production of synthetic resins which can be cross-linked by moisture in the cold, e.g., firmly adhering, very light-fast elastic coatings and lacquers on a wide variety of metals and noble metals by simple and rapid dip varnishing of metal articles such as sheets or formed metal parts as well as the production of elastic and abrasion-resistant semi-hard or hard synthetic resin lacquers.

The use of the substances according to the invention for the high quality finishing of paper, textiles and foam resins, in particular polyurethane forms, is also important. In this connection, the fact that the products which have been stabilized in accordance with the invention can be used with alcohols and acid additives allows for particular elegant forms of application combined with controlled cross-linking. The activating effect of these acid additives advantageously only comes into effect when the products are put into use, namely during evaporation of the solvent mixtures which contain alcohol, whereas during storage of the products in closed containers these acid additives ensure complete constancy of the viscosity of the products. Cross-linking of the substances according to the invention, which can be brought about deliberately, sets in at once as soon as the alcohol concentration drops, e.g., when a film starts to dry in the presence of atmospheric moisture. This controlled cross-linking of the products, i.e., controlled in the sense that it can be brought about whenever required, e.g., in the presence of atmospheric moisture, can be activated to such an extent by the acid additives that it can be complete within a few minutes in the cold, the cross-linking reaction of the substances according to the invention resulting in the formation of polysiloxane bridge members.

The invention is further illustrated but is not intended to be limited by the following in which all parts and percentages are by weight unless otherwise specified.

EXAMPLE 1

200 parts by weight (0.1 mol) of an adipic acid/ethylene glycol polyester with OH number 56 are dehydrated at 120 °C. for 30 minutes and then reacted with 44.4 parts by weight of 1-isocyanato-3,3,5-trimethyl-5-isocyanato-methyl-cyclohexane (=0.2 mol) at this temperature for 30 minutes to form the α, $^{2}/_{3}$-diisocyanato prepolymer. The temperature of the NCO prepolymer is allowed to fall to 100°C. and this is then diluted with 100 parts by weight of toluene. The solution is then cooled to 30°C. and rapidly diluted with 200 parts by weight of a solvent mixture of toluene/tertiary butanol (1:1), and a solution of 13 parts by weight of 1-amino-3,3,5-trimethyl-5-amino methylcyclohexane (=isophorone diamine) and 9.8 parts by weight of $H_2N-CH_2-CH_2-NH-CH_2-Si(-OC_2H_5)_3$ in a solvent mixture of 216 parts by weight of anhydrous toluene and 216 parts by weight of anhydrous tertiary butanol is then introduced dropwise into this solution at 20° to 24°C. within 20 minutes with rapid stirring. A water-clear solution of a polyester-polyurethane polyurea in which the ethoxysilane radicals are statistically distributed in the chain is obtained. Viscosity of the solution: 1,400 centipoises at 25°C. (= Solution A).

Solution A is completely free from gelled particles and cross-linked polyaddition products. If stored free from moisture the solution is stable at room temperature for 30 days; after that time, the viscosity continuously rises and soon exceeds 30,000 cP and the polyurethane-polyurea is finally completely cross-linked. All the viscosity measurements are carried out in unopened sample tubes each one of which is used for only one measurement. The tubes are heated to 110°C. before sample A is introduced and they are then filled and sealed. Continuous measurement of the viscosity yields the following results: The stability of Sample A in storage is greatly increased by the addition of 0.5% by weight of acetic acid anhydride, the viscosity remaining practically unchanged at 1480 centipoises at 25°C. even after six months at 20° to 25°C. (Solution B).

When Samples A and B are poured out on glass supports, very strong, high quality films, which adhere firmly to glass are obtained. The films obtained from Sample A are cross-linked quantitatively after 35 minutes at a relative humidity of about 60% while sample B, which is more stable in storage, is completely cross-linked only 15 minutes after formation of the film. The amount of cross-linked polyurethane-polyurea was determined by gravimetric measurement of constituents not dissolved in dimethylformamide. This test is carried out with an accuracy of ±0.5% i.e., with a high degree of accuracy, since uncross-linked polyurethane polyureas from Example 1 are very rapidly soluble in dimethyl-formamide at only 40°C. over the whole molecular weight range of 40,000 to 200,000.

Cross-linked films of the two Samples A and B whether in the form of highly elastic lacquers or in the form of coatings, have surprisingly high strength, stretchability and elasticity and excellent abrasion resistance, maximum light fastness and resistance to chemicals. These properties are due to the high urea group concentration of the samples and the resulting intermolecular forces.

When the acetic anhydride used in this example to affect extreme stabilization is replaced by a. 0.3 percent by weight of acetic acid,
b. 0.4 percent of weight of propionic anhydride,
c. 0.05 percent by weight of dimethyl carbamic acid chloride,
d. 0.04 percent by weight of formic acid,
e. 0.03 percent by weight of methyl p-toluenesulphonate, and
f. 0.05 percent by weight of p-toluenesulphonylisocyanate, the samples are found to have good stability in storage when tested over a period of 4 months, the changes in viscosity at 21°C. being as follows:
a. 1520 centipoises
b. 1550 centipoises
c. 1600 centipoises
d. 1580 centipoises
e. 1620 centipoises
f. 1570 centipoises

EXAMPLE 2

25 parts by weight of 4,4'-diisocyanato-diphenylmethane are dissolved at room temperature in 100 parts by weight of highly purified dimethylformamide which has been completely dehydrated over $P_2O_5$, and the solution is cooled to 10°C. 46.8 parts by weight of chain lengthening agent $(C_2H_3-O-)_3Si-CH_2NH-(CH_2)_6-NH-CH_2Si(-OC_2H_5)_3$ are added dropwise with vigorous stirring in the course of 10 minutes.

An exceptionally reactive high molecular weight polyurea which has an extremely high concentration of ethoxy silane groups is obtained. Viscosity of the resulting solution at 20°C.: 1150 centipoises. The polyaddition product undergoes quantitative cross-linking in air (relative humidity 30 –70%) in 2 minutes to form hard films.

When the solution is heated, 5-silaimidazolidone-(2) ring closure already starts at 40°C. and proceeds very rapidly at 100°C. with splitting off of ethanol, very hard, elastic films being obtained which have high thermal resistance since practically all the hydrogen atoms in the chain are substituted by 5-silaimidazolidone-2) formation. A film with equally good suppleness and flexibility is obtained after 3 hours' heat treatment at 210°C.

EXAMPLE 3

This example demonstrates that high quality cross-linked synthetic resins can be produced in one step by the process according to the invention. 200 parts by weight of the dehydrated polyester used in Example 1 are reacted with 87 parts by weight of 4,4'-diisocyanatodiphenylmethane at 120°C. 18 parts by weight of butane-1,4-diol are then stirred in at 110°C., followed by rapid addition of 4.72 parts by weight of the following chain lengthening agent which contains 2 amino groups:

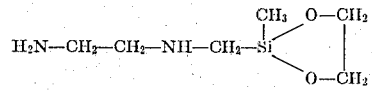

The reaction mixture is immediately poured into a mold which has not been preheated but has been kept in air (60% relative humidity) at room temperature. A test plate 0.5 cm in thickness is completely cross-linked after only 10 minutes, and after 2 days' storage at 22°C. it has the following properties:

| | |
|---|---|
| Tensile strength | 190 kg/cm² |
| Elongation at break | 480% |
| Permanent elongation | 8% |
| Shore A hardness | 68 |
| Elasticity | 45% |

EXAMPLE 4

The procedure is the same as described in Example 1 but equivalent quantities of other diisocyanates are used for the preparation of the prepolymer, namely:
a. 33.6 parts by weight of hexamethylenediisocyanate
b. 37.6 parts by weight of m-xylylene diisocyanate
c. 42.0 parts by weight of trimethylhexamethylenediisocyanate
d. a mixture of 16.8 parts by weight of hexamethylene diisocyanate and 22.2 parts by weight of 1-isocyanato-3,3,5-trimethyl-5-isocyanatomethylcyclohexane,
e. 58 parts by weight of an isocyanate telomer prepared according to German Patent Application LeA 11,106 from hexamethylenediisocyanate and vinyl acetate, which telomer contains 40% by weight of grafted polyvinyl acetate and is dissolved in excess hexamethylene diisocyanate. NCO content of the solution 29%, hexamethylene diisocyanate content 58% by weight.
f. 52.4 parts by weight of 4,4'-diisocyanato dicyclohexylmethane,
g. 25 parts by weight of 4,4'-diisocyanatodiphenylmethane and 22.4 parts of 1-isocyanato-3,3,5-trimethyl-5-isocyanatomethylcyclohexane,
h. 17.4 parts by weight of 1-methylbenzene-2,4-diisocyanate and 22.4 parts by weight of 1-isocyanato-3,3,5-trimethyl-5-isocyanatecyclohexane.

Polyurea formation and introduction of the reactive ethoxysilane groups are carried out exactly as in Example 1, using a mixture of 13 parts by weight of 1-amino-3,3,5-trimethyl-5-aminomethylcyclohexane and 9.8 parts by weight of H₂N—CH₂—CH₂—NH—CH₂—Si(—OC₂H₅)₃.

The solvent mixture used in the case of (a) to (h) is a mixture of toluene and isopropanol (1:1). Stable, highly reactive polyester-polyurethane-polyureas which can be cross-linked in the cold by atmospheric moisture are obtained in the form of 20% by weight solutions which when made up into films have tensile strengths of 190 to 210 kg/cm² and the following viscosities at 25°C.:
a. 2400 centipoises
b. 3500 centipoises
c. 1900 centipoises
d. 2100 centipoises
e. 4800 centipoises
f. 3200 centipoises
g. 5300 centipoises
h. 4200 centipoises.

When 20% solutions of the polyurethane-polyureas mentioned under (a) to (f) are poured on to wood, sheet metal, textile, leather or synthetic resin supports, soft, cross-linked and highly elastic films are obtained. They have high abrasion resistance, high folding strength and extremely high light fastness and may be used e.g., for the production of highly elastic lacquer films and coatings.

EXAMPLE 5

The procedure is the same as described in Example 1 but the solvent mixture of toluene and tertiary butanol is replaced by dimethylformamide (anhydrous) which is also stabilizing. The procedure is the same as in Example 1 but monomeric diisocyanate is replaced by 50 parts by weight of 4,4'-diisocyanatodiphenylmethane (prepolymer formation at 90°C.) and the following diamines are used as chain lengthening agents:

a. 0.08 mol of 1-amino-3,3,5-trimethyl-5-aminomethyl-cyclohexane and 0.02 mole of H₂N—CH₂—CH₂—NH—CH₂—Si(OC₂H₅)₃ b. 0.08 mol of ethylene diamine and

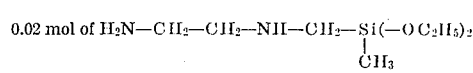

c. 0.08 mol of ethylene diamine and

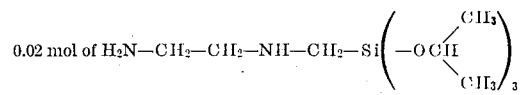

d. 0.08 mol of 4,4'-diamino-dicyclohexylmethane and 0.02 mol of H₂N—CH₂—CH₂—NH—CH₂—Si(OC₄H₉)₃ e. 0.08 mol of m-xylylenediamine and 0.02 mol of

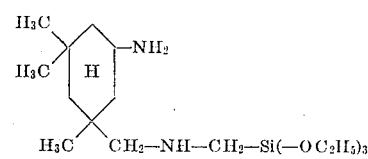

f. 0.08 mol of 4,4'-diamino-diphenylmethane and

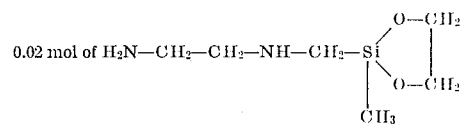

All the diamine mixtures (a) to (f) are dissolved in 120 parts by weight of isopropanol and introduced dropwise into the solution of NCO prepolymer in dimethylformamide in the course of one half hour at room temperature with vigorous stirring.

The solutions obtained are stable in storage and have the following viscosities at 25°C.:
a. 2,500 centipoises
b. 5,800 centipoises
c. 6,000 centipoises
d. 3,500 centipoises
e. 3,500 centipoises
f. 9,300 centipoises When the samples are poured on to glass supports and dimethylformamide is evaporated off at 70°C. in the atmosphere, films which are cross-linked via the siloxane groups and which are completely insoluble even in boiling dimethylformamide are obtained.

EXAMPLE 6

The procedure is exactly the same as in Example 1 but only 4.5 parts by weight of H₂N—CH₂—CH₂—NH—CH₂—Si(OC₂H₅)₃ are used as chain lengthening agent and in addition 4.8 parts by weight of C₆H₁₁—NH—CH₂—Si (—OC₂H₅)₃ are added as chain breaking agent. The procedure is otherwise exactly the same as described in Example 1. The polyaddition products obtained contain silyl urea groups with ethoxysilane radicals as end groups in addition to the ethoxysilane radicals which are statistically built into the molecule. Viscosity of the solution 850 cP/25°C. When films are cast from this solution, they crosslink after only 2 minutes in air at a reactive humidity of 60%.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A process for the preparation of polyaddition products which contain alkoxysilane groups, comprising reacting in the presence of 10 to 80% by weight based on the sum of the reactants of a secondary or tertiary alcohol at a temperature between −20°C and +150°C an alkoxysilane group of the general formula

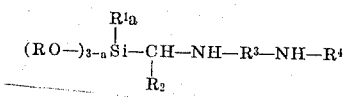

in which

R represents a $C_1$–$C_{18}$ alkyl radical or a $C_4$–$C_{14}$ cycloalkyl radical, a phenyl or a benzyl radical, $R^1$ represents a $C_1$–$C_{18}$ alkyl, $C_4$–$C_{18}$ cycloalkyl or $C_6$–$C_{10}$ aryl radical, $R^2$ represents a hydrogen atom or a methyl or phenyl radical, $R^3$ represents a $C_2$–$C_{16}$ divalent aliphatic hydrocarbon radical and the radical obtained by removing the amino groups from 1-amino-3,3,5-trimethyl-5-aminomethyl-cyclohexane

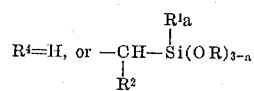

and $a$= 0, 1 or 2, with organic polyisocyanates.

2. A process according to claim 1 characterized in that the reaction is carried out with polyhydroxyl compounds or polyamines containing at least two hydrogen atoms that are reactive with isocyanates and having a molecular weight of 62 to 6000.

3. A process according to claim 1 wherein the secondary and tertiary alcohols are selected from the group consisting of isopropanol, isobutanol, cyclohexanol, tertiary amyl alcohol and tertiary butanol.

4. A process according to claim 1 wherein the reaction mixtures includes 2 to 60% by weight based on the quantity of the alkoxysilane present an amino alkyl silane derivative comprising the general formula

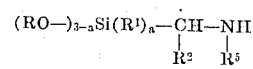

in which R, $R^1$, $R_2$ and $a$ have the meaning stated in claim 1 and $R^5$ represents hydrogen.

5. A process according to claim 1 wherein the reaction mixtures includes 2 to 60% by weight based on the quantity of the alkoxysilane present an amino alkyl silane derivative comprising the general formula.

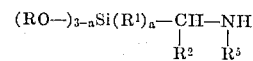

in which R, $R^1$, $R^2$ and $a$ have the meaning stated in claim 1 and $R^5$ represents a cyanosubstituted alkyl, cycloalkyl, arylalkyl, aryl or alkylaryl radical with up to 46 atoms.

* * * * *

UNITED STATES PATENT AND TRADEMARK OFFICE
CERTIFICATE OF CORRECTION

PATENT NO. : 3,856,756

DATED : DECEMBER 24, 1974

INVENTOR(S) : KUNO WAGNER, GUNTER OERTEL, HANS DIETRICH GOLITZ, deceased and BERND QUIRING It is certified that error appears in the above-identified patent and that said Letters Patent are hereby corrected as shown below:

First page, first formula in [57] ABSTRACT, correct that portion of the formula which reads "CH" so that it now reads $-\text{CH}-$
$R_2$ $\quad R^2$ Column 1, line 11, between "surface" and "agents" insert --active--; same column, line 18, after "contain" and before "substituted" insert --are silyl--

Column 2, line 12, correct the portion of the formula which reads "CH" so that it now reads $-\text{CH}-$
$R^2$ $\quad R_2$ Column 3, line 42, after "epichlorohydrin" and before "should" insert --or tetrahydrofuran--; same column, lines 50 & 51 correct the spelling of --trimethylolpropane--

Column 4, line 9, correct "4,00" so that it now reads --4,000--; same column, line 26, correct that portion of the formula which reads "CH" so that it now reads --CH--; same column, line 68, insert a
$R^2$ $\quad R_2$
hyphen in the space between "methyl" and "triethoxysilane"

Column 5, line 44, correct --halogenated-- so that it reads as a single word

Column 8, line 30, correct "d-2/3-dihydroxy" so that it reads --d-ω-dihydroxy--

UNITED STATES PATENT AND TRADEMARK OFFICE
CERTIFICATE OF CORRECTION

PATENT NO. : 3,856,756
DATED : December 24, 1974
INVENTOR(S) : Kuno Wagner et al.

Page 2 of 2

It is certified that error appears in the above-identified patent and that said Letters Patent are hereby corrected as shown below:

Column 9, line 2, insert --examples-- after "following" and before "in"; same column, line 11, correct "d-2/3-diisocyanato" so that it now reads --d-ω-diisocyanato--

Column 10, lines 27 & 28, correct the formula so that it reads $--(C_2H_3-O-)_3Si-CH_2-NH-(CH_2)_6-NH-CH_2-Si(-OC_2H_5)_3--$; same column, line 42, correct '2)" so that it now reads --(2)--

Column 11, line 34, after "-5-" correct "isocyanate" so that it reads --isocyanato--

Column 13, line 23, correct that portion of the formula "$\underset{R^2}{CH}$" so that it reads $\underset{R_2}{-CH-}$

Signed and Sealed this

Seventh Day of September 1976

[SEAL]

Attest:

RUTH C. MASON
*Attesting Officer*

C. MARSHALL DANN
*Commissioner of Patents and Trademarks*